United States Patent

[11] 3,590,649

| [72] | Inventor | Heinz Fischer |
| | | Obergosgen, Switzerland |
| [21] | Appl. No. | 832,224 |
| [22] | Filed | June 11, 1969 |
| [45] | Patented | July 6, 1971 |
| [73] | Assignee | Meier & Co. |
| | | Niedergosgen (Canton of Soleure), Switzerland |
| [32] | Priority | June 18, 1968 |
| [33] | | Switzerland |
| [31] | | 9010/68 |

[54] CONTINUOUSLY VARIABLE V-BELT DRIVE
3 Claims, 2 Drawing Figs.

[52] U.S. Cl. ................................................ 74/230.17
[51] Int. Cl. ................................................ F16h 55/22
[50] Field of Search ................................ 74/230.17, 217

[56] References Cited
UNITED STATES PATENTS

| 2,283,392 | 5/1942 | Shadrick | 74/230.17 |
| 2,611,464 | 9/1952 | Rabe | 74/230.17 X |
| 2,852,953 | 9/1958 | Karig | 74/230.17 |
| 2,937,042 | 5/1960 | Wilder | 74/230.17 UX |
| 3,034,367 | 5/1962 | Steuer | 74/230.17 |
| 3,102,431 | 9/1963 | Maurer | 74/230.17 |
| 3,190,135 | 6/1965 | Berens | 74/230.17 |
| 3,234,806 | 2/1966 | Maurer et al. | 74/230.17 |
| 3,324,736 | 6/1967 | Bassoff | 74/230.17 |

*Primary Examiner*—Leonard H. Gerin
*Attorney*—Werner W. Kleeman

ABSTRACT: The input side has two axially aligned shafts, one of which is the drive shaft and the other of which mounts two cone wheels forming a sheave for the V-belt. The drive shaft and one of the cone wheels each incorporate a cone race that with balls form a ball bearing which exerts a torque-dependent lateral pressure on the belt.

3,590,649

CONTINUOUSLY VARIABLE V-BELT DRIVE

BACKGROUND OF THE INVENTION INVENTION

The invention relates to a continuously variable V-belt drive, including an input shaft means, an output shaft means, a pair of spaced cone wheels adjustably arranged on each shaft means, means comprising a drive part and a driven part for exerting a torque-dependent side pressure on the V-belt and for coupling at least one of the cone wheels to the drive part.

SUMMARY OF THE INVENTION

V-belt drives, or variable belt drives, having two pairs of cone wheels mounted on respective, oppositely located shafts are known in the prior art. These schemes incorporate means for exerting a torque-dependent side pressure on the belt for evening out the considerable load variations, particularly when raising the r.p.m., and for preventing slipping and flapping of the V- or wedge-shaped belt running between the adjustable cone wheels. These means are complicated and, therefore, expensive to manufacture. Since they must operate on the adjustable cone wheels through levers, rods, and other connecting elements, the pressure of the cone wheels on the belt is evened out only after some delay. The sum of the torques of the input and output shafts has also been used to provide an additional force to press the movable cone wheels toward the stationary cone wheels, or else, after some delay, to press on all of the cone wheels, many of these torque-dependent V-belt drives being usable for only one direction of rotation.

Up to the present time, various kinds of spring elements have been conventionally used to press the cone wheel against the belt. These elements, however, to about the same degree have the following disadvantages.

With sudden large increases in load or with high starting torques, the V-belt pushed apart the pair of spring-supported cone wheels: the belt runs slack, the lateral pressure on the belt falls, and the belt begins to slip and flap. The load-dependent means for exerting a side pressure on the belt increases this detrimental effect. To prevent the effect, the belt contact surfaces of the cone wheels were left very rough, but this only wore out the belts very quickly.

SUMMARY OF THE INVENTION

The purpose of the invention is to provide a continuously variable V-belt drive having a torque-dependent means for exerting a side pressure on the belt, the V-belt drive of the invention avoiding the previously discussed drawbacks of the prior art, while still being relatively simple in design, relatively inexpensive to manufacture, and robust.

BRIEF DESCRIPTION OF THE DRAWINGS

The invention will be described, with reference to the Figures of the accompanying drawings, wherein.

DESCRIPTION OF THE PREFERRED EMBODIMENT

Figure 1:
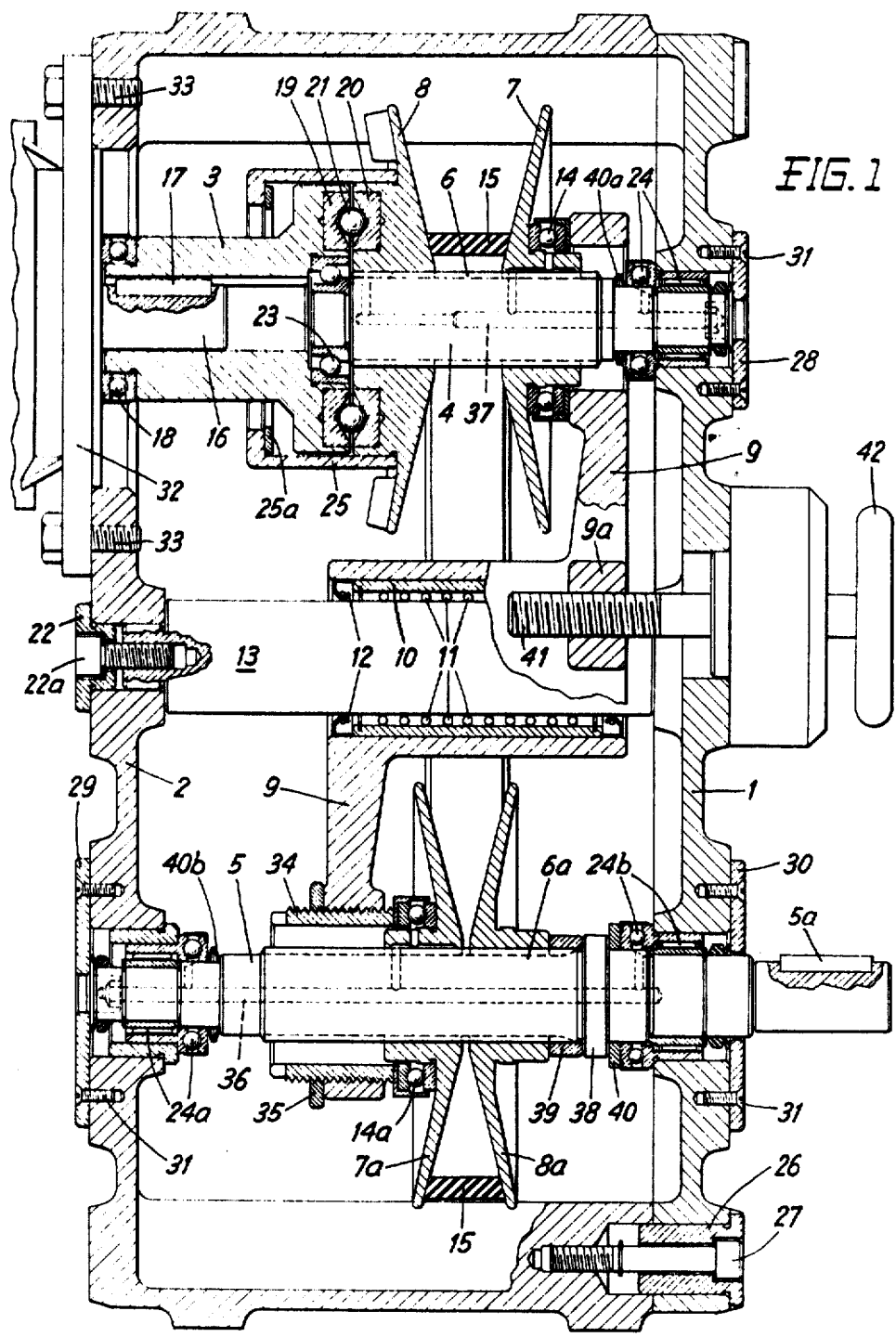
FIG. 1 is a longitudinal section of the moving-picture of the invention, with a drive motor (partly shown) flange mounted on the belt drive casing.

The continuously variable V-belt drive includes a housing consisting of an end plate 1 and a casing 2. Arranged within the housing are two axially aligned shafts 3 and 4, serving as the input shaft arrangement, and the power takeoff shaft 5 as the output shaft. The shaft 3 is the drive shaft. The input shaft arrangement 3, 4 and the output shaft 5 have fixed to them a respective slotted sleeve 6 and 6a. A respective, axially adjustable cone wheel 7 and 7a and a respective cone wheel 8 and 8a are mounted on each of these sleeves, the wheels 7 and 7a, on the one hand, and the wheels 8 and 8a, on the other, being diagonally opposite one another. The wheel pairs 7 and 8 and 7a and 8a each form a sheave for the V-belt. A two-arm lever 9 is located centrally between the wheels 7 and 7a. A bushing 10 having balls 11 and a retaining ring 12 mounts the two-arm lever free to move along a guide bolt 13 securely screwed to the casing 2. A respective thrust ball bearing 14 and 14a is located between the adjustable cone wheels 7 and 7a and the two-arm lever 9.

To obtain the desired transmission ratio, the two-arm lever 9 is moved axially by turning the wheel 42 in one or the other direction to screw the threaded bolt in or out of a nut 9a fixed to the two-arm lever 9. The latter can be adjusted mechanically, by hand or by a servomotor, or hydraulically. It can also be remotely controlled. The wide V-belt is denoted by the reference numeral 15.

The drive shaft 3 is hollow and accepts the end 16 of the shaft of the electric drive motor (not shown). A key 17 holds the shaft end 16 tightly in the hollow of the shaft 3. The exposed end of the power takeoff shaft 5 has a key 5a and can be coupled to some kind of driving connection for powering a machine. A thrust ball bearing 18 and thrust radial bearings 24, 24a, and 24b bear the thrust of the two-arm lever 9 and of the arrangement for exerting a side pressure on the belt, the arrangement consisting of a drive part 19, of a driven part 20 built into the cone wheel 8, and of balls 21 running on the conical, ball race faces of the parts 19 and 20. These balls turn the part 20 and cause a torque-dependent side pressure on the belt 15. The one end of the guide bolt 13 is fixed to the casing 2 by a guide sleeve 22 and a socket head capscrew 22a. The drive shaft 3 turns on a ball bearing 23 held on the shaft 4. The drive part 19, built into the drive shaft 3, and the driven part 20, are surrounded by a protective sleeve 25 and a damping ring 25a. Socket head capscrews 27 in guide sleeves 26 fix the end drum 1 to the casing 2. The thrust radial bearings are protected by covers 28, 29, and 30, which countersunk screws 31 fix to the housing. Similarly, the drive-motor flange 32, held by screws 33, protects the drive shaft 3. The threaded sleeve 34, having a guard ring 35, enables adjustment of the belt tension. The oilways 36 and 37 permit lubrication of all of the bearings and movable parts, including the arrangement 19, 20, and 21. Provided between the cone pulley 8a and a shaft collar 38 is a spacing ring 39 and between the bearing 24b and the collar 38 a compensating washer 40. This arrangement permits the power takeoff end of the shaft 5, with its key 5a, to be reverse mounted or for the power takeoff end to be shifted to the opposite end. A respective compressed spring annulus 40a and 40b is inserted between the bearings 24 and 24a and a shoulder on the shafts 4 and 5.

Figure 2:
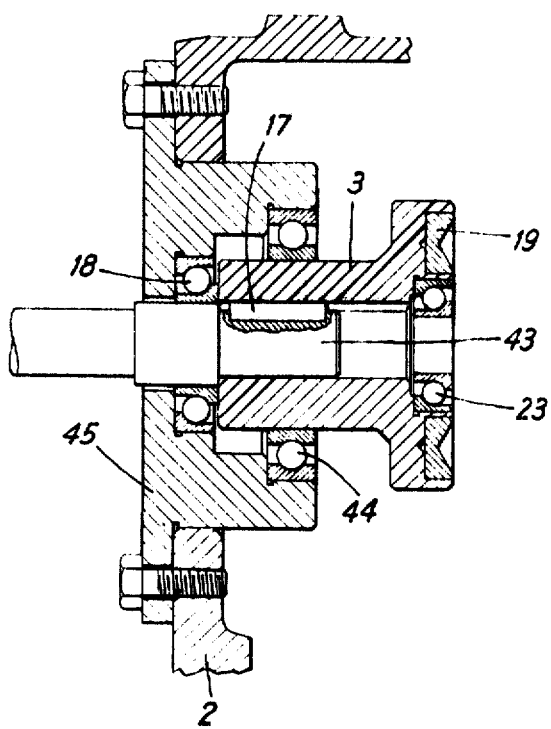
FIG. 2 is a cross-sectional view of a drive shaft with a special flange.

With reference to FIG. 2, a modification of the drive for the drive shaft 3 comprises a shaft end 43, which the key 17 makes rotationally rigid with the parts 3 and 19. The shaft end 43 turns in the thrust ball bearing 18 mounted in a flange 45 and is driven by a motor (not shown) through a belt drive (also not shown). The arrangement of the bearing 23 is exactly drum same as in the flange-mounted-motor drive arrangement shown in FIG. 1. Since the shaft end 43 is not supported by a bearing gears of the belt drive of the invention, an additional ball bearing 44 is provided for the drive shaft 3.

In addition to being simple, inexpensive, trouble free, and having a long life, the invention possesses the following advantages.

A. By dividing the input end into the shafts 3 and 4, the torque is directly transmitted by the balls 21 from the drive part 19 to the driven part 20, since the balls running in the conical races of the parallel 19 and 20 exert an axial pressure on the belt 15 and shift it when necessary. There is, in other words, no intermediate member responsive to load changes. The axial pressure is transmitted by the wheel 8 to the belt 15, and the two-arm lever 9 on the other side of the belt acts as a stabilizing support, thereby directly and quickly preventing the belt from vibrating or whipping. When the belt stretches because of the load, the diameter of the belt path increases.

B. Instead of the hitherto used rough belt contact surfaces of the sheaves, these surfaces can now be smooth and at least approximately polished. Since vibration is avoided, the cone wheels of these sheaves enable that the V-belt runs under the effects of suction and adhesion, thereby avoiding slippage and quick wearing of the belt.

C. Owing to the fact that the drive shaft 3 is hollow and that it incorporates the drive part 19, there can be used standard motors with flange mounting, as in FIG. 1, or else other drives connected to the belt drive by a shaft end turning in a special external bearing, as in FIG. 2.

Although the preferred embodiment of the invention has been described, the scope of, and the breadth of protection afforded to, the invention are limited solely by the appended claims.

What I claim is:

1. An infinitely variable V-belt drive arrangement, comprising input shaft means incorporating two coaxially arranged shaft members disposed behind one another, said shaft members being relatively rotatable with respect to one another through a limited extent, output shaft means, a first pair of spaced cone wheels adjustably mounted on one of said shaft members of said input shaft means, a second pair of spaced cone wheels adjustably mounted upon said output shaft means, a V-belt member trained about said first and second pairs of cone wheels, means for mounting a respective one of each pair of said cone wheels to be axially displaceable but nonrotatable with respect to its associated shaft means, said axially displaceable cone wheel of each associated shaft means being situated diagonally opposite one another, a displaceable two-arm lever means for supporting said respective diagonally opposite situated axially displaceable cone wheels, means for mounting said two-arm lever means intermediate said input shaft means and said output shaft means for displacement in a direction substantially parallel to both said shaft means, means for exerting a torque-dependent side pressure upon said V-velt member provided for said input shaft means, said torque-dependent means comprising a drive part and a driven part and ball means disposed intermediate said drive part and said driven part, said driven part being rigidly connected with said cone wheel of said input shaft means seated opposite said axially displaceable cone wheel of said first pair of cone wheels seated upon said one shaft member of said input shaft means, said drive part of said torque-dependent means being rigidly seated upon the other shaft member of said input shaft means.

2. The infinitely variable V-belt drive arrangement as defined in claim 1, wherein said other shaft member supporting said drive part possesses a hollow construction, and drive means including a drive element inserted into said hollow construction of said other shaft member.

3. An infinitely variable V-belt drive arrangement as defined in claim 1, wherein each of said spaced cone wheels possesses belt contact surfaces which are smooth.